(12) United States Patent
Zhang et al.

(10) Patent No.: US 11,743,939 B2
(45) Date of Patent: *Aug. 29, 2023

(54) RANDOM ACCESS CHANNEL (RACH) OCCASION TYPE INDICATION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 17/206,434

(22) Filed: Mar. 19, 2021

(65) Prior Publication Data
US 2022/0304047 A1 Sep. 22, 2022

(51) Int. Cl.
| | |
|---|---|
| H04W 74/00 | (2009.01) |
| H04W 74/08 | (2009.01) |
| H04L 5/14 | (2006.01) |
| H04W 72/044 | (2023.01) |
| H04W 76/27 | (2018.01) |
| H04W 80/02 | (2009.01) |
| H04W 56/00 | (2009.01) |
| H04W 72/23 | (2023.01) |

(52) U.S. Cl.
CPC ............. *H04W 74/008* (2013.01); *H04L 5/14* (2013.01); *H04W 56/001* (2013.01); *H04W 72/046* (2013.01); *H04W 72/23* (2023.01); *H04W 74/0833* (2013.01); *H04W 76/27* (2018.02); *H04W 80/02* (2013.01)

(58) Field of Classification Search
None
See application file for complete search history.

(56) References Cited

U.S. PATENT DOCUMENTS

| | | | | |
|---|---|---|---|---|
| 11,606,821 | B2 * | 3/2023 | Zhang | H04W 72/23 |
| 2019/0253124 | A1 * | 8/2019 | Awada | H04L 1/1621 |
| 2019/0254064 | A1 * | 8/2019 | Islam | H04W 74/0883 |
| 2019/0268060 | A1 * | 8/2019 | Nam | H04B 7/0695 |
| 2019/0268947 | A1 * | 8/2019 | Zhang | H04B 7/088 |
| 2019/0313449 | A1 * | 10/2019 | Tsai | H04W 74/006 |
| 2019/0327766 | A1 * | 10/2019 | Zhang | H04L 27/261 |
| 2019/0394749 | A1 * | 12/2019 | Islam | H04W 24/08 |
| 2021/0051672 | A1 * | 2/2021 | Rastegardoost | H04W 74/006 |
| 2021/0076384 | A1 * | 3/2021 | MolavianJazi | H04B 17/318 |
| 2021/0329718 | A1 * | 10/2021 | Hu | H04W 76/11 |
| 2021/0352692 | A1 * | 11/2021 | Lei | H04B 7/0695 |
| 2022/0123819 | A1 * | 4/2022 | Taherzadeh Boroujeni | H04W 74/0833 |
| 2022/0182110 | A1 * | 6/2022 | Zhang | H04L 5/14 |

(Continued)

*Primary Examiner* — Faiyazkhan Ghafoerkhan
(74) *Attorney, Agent, or Firm* — Patterson + Sheridan, LLP

(57) ABSTRACT

Certain aspects of the present disclosure provide techniques for indicating random access channel (RACH) occasion (RO) type(s). An example method by a user equipment (UE) generally includes receiving, from a base station (BS), a configuration indicating whether each RO of a plurality of ROs is configured at the BS for full-duplex (FD) communication or half-duplex (HD) communication, selecting one of the plurality of ROs based on the configuration, and transmitting a RACH preamble during the selected one of the plurality of ROs.

30 Claims, 13 Drawing Sheets

(56) References Cited

U.S. PATENT DOCUMENTS

| | | | |
|---|---|---|---|
| 2022/0182999 A1* | 6/2022 | Zhang | H04L 5/0053 |
| 2022/0183041 A1* | 6/2022 | Zhang | H04W 72/046 |
| 2022/0190906 A1* | 6/2022 | Haghighat | H04W 74/0841 |
| 2022/0217711 A1* | 7/2022 | Zhang | H04W 72/046 |
| 2022/0240325 A1* | 7/2022 | Wu | H04W 74/0833 |
| 2022/0287097 A1* | 9/2022 | Zhang | H04W 72/23 |
| 2022/0295569 A1* | 9/2022 | Sakhnini | H04W 74/006 |
| 2022/0304047 A1* | 9/2022 | Zhang | H04W 74/0833 |

* cited by examiner

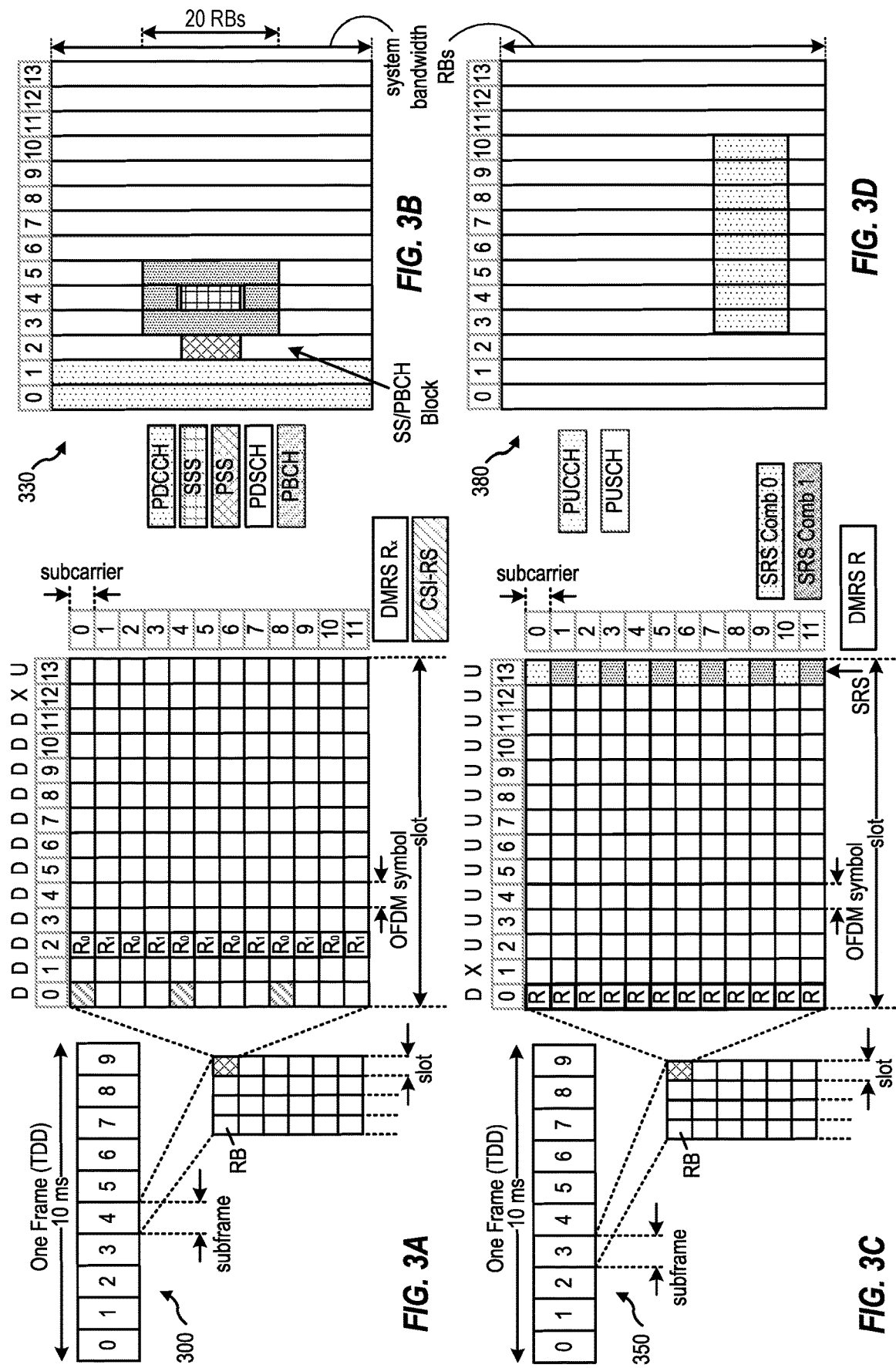

800

810

TRANSMIT, BY A BASE STATION (BS), TO A USER-EQUIPMENT (UE), A CONFIGURATION INDICATING WHETHER EACH RANDOM ACCESS CHANNEL OCCASION (RO) OF A PLURALITY OF ROS IS CONFIGURED AT THE BS FOR FULL-DUPLEX (FD) COMMUNICATION OR HALF-DUPLEX (HD) COMMUNICATION

820

RECEIVE, BY THE BS, A RANDOM ACCESS CHANNEL (RACH) PREAMBLE DURING ONE OF THE PLURALITY OF ROS USING THE FD OR THE HD COMMUNICATION IN ACCORDANCE WITH THE CONFIGURATION

*FIG. 8*

RANDOM ACCESS CHANNEL (RACH) OCCASION TYPE INDICATION

INTRODUCTION

Aspects of the present disclosure relate to wireless communications, and more particularly, to techniques for configuring a random access channel (RACH) procedure.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user-equipment (UE), comprising receiving, from a base station (BS), a configuration indicating whether each random access channel occasion (RO) of a plurality of ROs is configured at the BS for full-duplex (FD) communication or half-duplex (HD) communication; selecting one of the plurality of ROs based on the configuration; and transmitting a random access channel (RACH) preamble during the selected one of the plurality of ROs.

One aspect provides a method for wireless communication by a base station, comprising transmitting, to a UE, a configuration indicating whether each RO of a plurality of ROs is configured at the BS for FD communication or HD communication; and receiving a RACH preamble during one of the plurality of ROs using the FD or the HD communication in accordance with the configuration.

One aspect provides an apparatus for wireless communication by a UE, comprising a memory comprising executable instructions; one or more processors configured to execute the executable instructions and cause the apparatus to: receive, from a BS, a configuration indicating whether each RO of a plurality of ROs is configured at the BS for FD communication or HD communication; select one of the plurality of ROs based on the configuration; and transmit a RACH preamble during the selected one of the plurality of ROs.

One aspect provides an apparatus for wireless communication by a base station, comprising a memory comprising executable instructions; one or more processors configured to execute the executable instructions and cause the apparatus to: transmit, to a UE, a configuration indicating whether each RO of a plurality of ROs is configured at the BS for FD communication or HD communication; and receive a RACH preamble during one of the plurality of ROs using the FD or the HD communication in accordance with the configuration.

One aspect provides an apparatus for wireless communication by a UE, comprising: means for receiving, from a BS, a configuration indicating whether each RO of a plurality of ROs is configured at the BS for FD communication or HD communication; means for selecting one of the plurality of ROs based on the configuration; and means for transmitting a RACH preamble during the selected one of the plurality of ROs.

One aspect provides an apparatus for wireless communication by a base station, comprising: means for transmitting, to a UE, a configuration indicating whether each RO of a plurality of ROs is configured at the BS for FD communication or HD communication; and means for receiving a RACH preamble during one of the plurality of ROs using the FD or the HD communication in accordance with the configuration.

A non-transitory computer-readable medium comprising executable instructions that, when executed by one or more processors of a UE, cause the UE to: receive, from a BS, a configuration indicating whether each RO of a plurality of ROs is configured at the BS for FD communication or HD communication; select one of the plurality of ROs based on the configuration; and transmit a RACH preamble during the selected one of the plurality of ROs.

A non-transitory computer-readable medium comprising executable instructions that, when executed by one or more processors of a BS, cause the BS to: transmit, to a UE, a configuration indicating whether each RO of a plurality of ROs is configured at the BS for FD communication or HD communication; and receive a RACH preamble during one of the plurality of ROs using the FD or the HD communication in accordance with the configuration.

Other aspects provide apparatuses configured to perform the aforementioned methods as well as those described herein; non-transitory, computer-readable media comprising instructions that, when executed by one or more processors of an apparatus, cause the apparatus to perform the aforementioned methods as well as those described herein; a computer program product embodied on a computer readable storage medium comprising code for performing the aforementioned methods as well as those further described herein; and an apparatus comprising means for performing the aforementioned methods as well as those further described herein.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 8 is a flow diagram illustrating example operations for wireless communication by a base station.

DETAILED DESCRIPTION

The present disclosure provides apparatuses, methods, processing systems, and computer-readable mediums for random access channel (RACH) configuration. Various RACH occasions (RO) may be configured and selectable for transmitting a RACH preamble, as described in more detail herein with respect to FIG. 9. A user equipment (UE) may transmit the RACH preamble for initial access to the network or transmit the RACH preamble while already in connected mode (e.g., to configure an updated timing advance (TA)). A base station (BS) may be configured differently during different ROs, which impacts the likelihood of whether an uplink (UL) signal from the UE is received successfully at the BS. For example, the BS may configure some ROs as full-duplex (RD) ROs, while others as half-duplex (HD) ROs. For FD ROs, the BS may receive and transmit UL and downlink (DL) signaling simultaneously, resulting in self-interference at the BS and reducing the likelihood that the BS may successfully receive the UL signaling. Without knowledge regarding the configuration of the ROs at the BS, a UE may be unable to make an informed decision as to which RO to use in order for the UE to meet various specifications at the UE (e.g., a latency specification) while enhancing spectrum efficiency and increasing resource utilization.

Certain aspects of the present disclosure are directed to indicating an RO configuration to a UE, allowing the UE to make an informed decision regarding which the RO to use. For example, the UE may receive an RO configuration indication from the BS indicating whether each RO is configured as an FD RO or HD RO at the BS. With the indicated configuration, the UE can decide on which RO with a particular RO type to use for RACH message transmission based on predefined rules.

Figure 6:
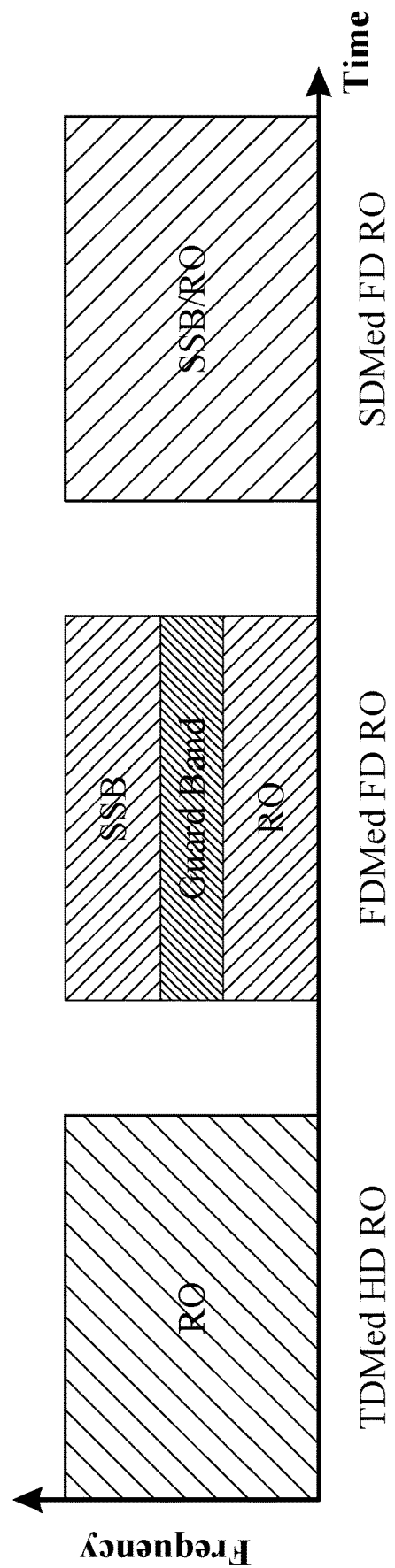
FIG. 6 illustrates half-duplex, frequency division multiplexed (FDMed) FD, and spatial division multiplexed FD modes.

The RO configuration indication may also include information regarding whether each FD RO is a frequency-division multiplexed (FDMed) or spatial-division multiplexed (SDMed) RO, as described in more detail herein with respect to FIG. 6. For instance, the BS may indicate that ROs 1-20 with corresponding time and frequency (TF) allocations are time-division multiplexed (TDMed) ROs (e.g., HD ROs), ROs 21-40 with corresponding TF allocations are FDMed ROs, and that ROs 41-60 with corresponding TF allocations are SDMed ROs. The BS may also indicate a corresponding RSRP or SINR threshold for beam or beam pair selection for the RO and other information such as the corresponding transmit power to be used and guard band associated with the RO (e.g., if the RO is an FDM RO). The UE may select the RO using the information indicated by the BS, allowing the UE to beneficially select an RO that reduces latency, enhances spectrum efficiency, and increase resource utilization.

Introduction to Wireless Communication Networks

Figure 1:
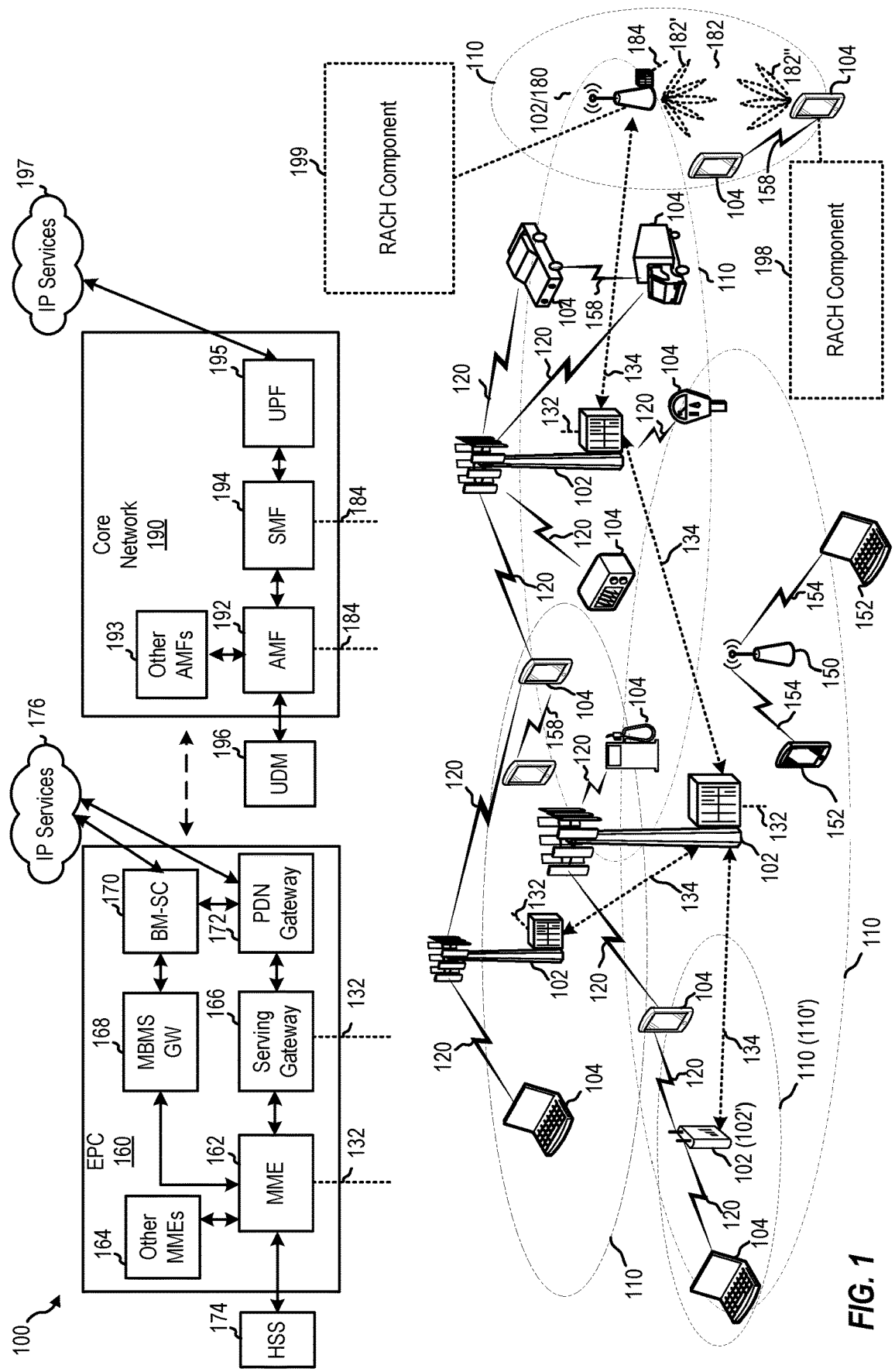
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 includes random access channel (RACH) component 199, which may be configured to indicate, to a UE, a type associated with each of multiple RACH occasions (ROs). Wireless network 100 further includes RACH component 198, which may be configured to select a RO for transmitting a RACH preamble based on the indicated type of the ROs.

Figure 2:
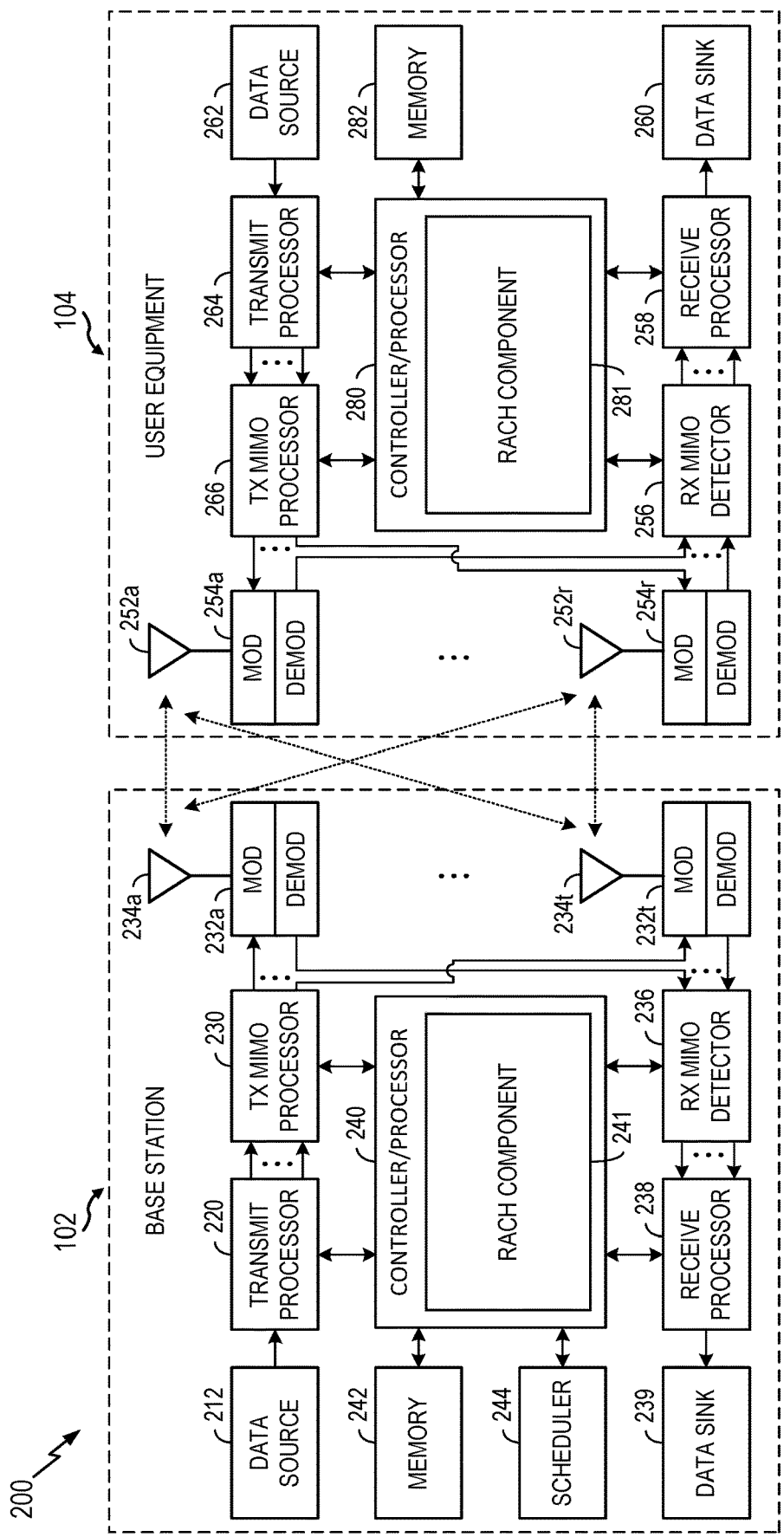
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., source data 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes RACH component 241, which may be representative of RACH component 199 of FIG. 1. Notably, while depicted as an aspect of controller/processor 240, RACH component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., source data 262) and wireless reception of data (e.g., data sink 260).

User equipment 104 includes controller/processor 280, which may be configured to implement various functions related to wireless communications. In the depicted example, controller/processor 280 includes RACH component 281, which may be representative of RACH component 198 of FIG. 1. Notably, while depicted as an aspect of controller/processor 280, RACH component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example Full-Duplex Communication

Certain aspects of the present disclosure are directed to techniques for implementing full-duplex (FD) communication. FD communication generally refers to simultaneous transmission and reception of signals (e.g., uplink (UL) and downlink (DL) transmissions). The simultaneous UL/DL transmissions may be in FR2, as described above.

FD capability may be present at either a base station (BS), a user equipment (UE), or both. For instance, at the UE, UL may be via one antenna panel and DL reception may be via another antenna panel. Similarly, at the BS, UL may be via one antenna panel (e.g., at one transmission-reception point (TRP)) and DL reception may be via another antenna panel (e.g., at another TRP).

FD capability may be conditional on beam separation to reduce self-interference between DL and UL and clutter echo (e.g., due to objects causing reflection of signaling). FD communication facilitates latency reduction by allowing reception of DL signal in UL only slots, or UL signal in DL only slots. FD communication also provides spectrum efficiency enhancements per cell and per UE, and provides more efficient resource utilization.

Figure 4A:
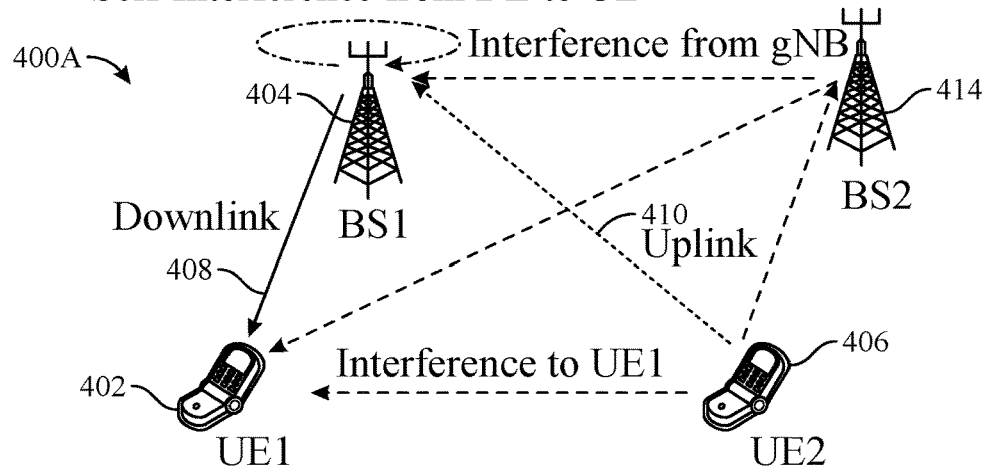
FIGS. 4A-4C are diagrams of example full-duplex communication deployments.
Figure 4B:
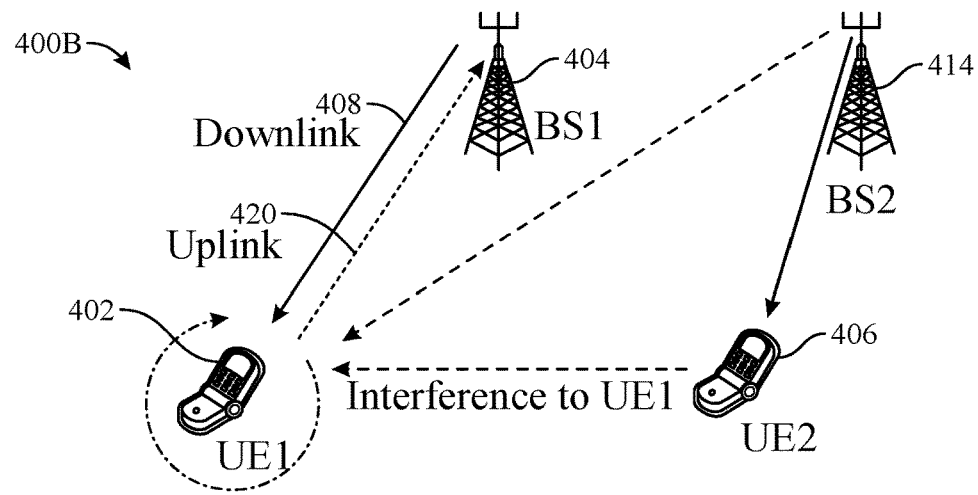
Figure 4C:
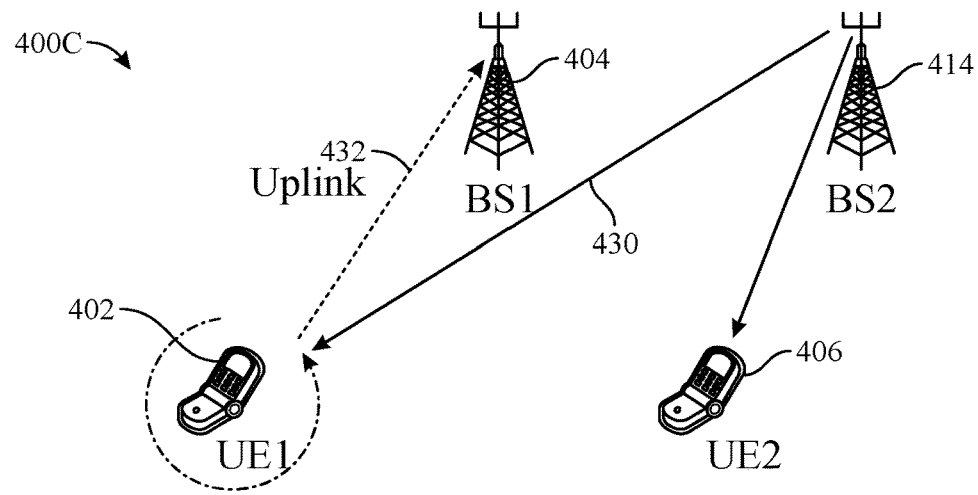

FIGS. 4A-4C are diagrams of example FD communication deployments. FIG. 4A illustrates a deployment 400A including a full-duplex (FD) BS and a half-duplex (HD) UE. As illustrated, a UE 402 (e.g., HD UE) may receive a DL transmission 408 from a BS 404 (e.g., FD BS), while another UE 406 may send an UL transmission 410 to the same BS 404. The UL transmission 410 and the DL transmission 408 may overlap in the time domain. The BS 404, operating in a FD mode, may thus experience self-interference from the DL transmission 408 to the reception by the BS of the UL transmission 410. Further, as shown, UE 402 may experience interference from UE 406 and another BS 414, and BS 404 may experience interference from BS 414.

FIG. 4B illustrates a deployment 400B including a FD BS and a FD UE. As illustrated, UE 402 may receive a DL transmission 408 from BS 404 and send an UL transmission 420 to the same BS 404. Thus, both UE 402 and BS 404 are operating in FD mode. UE 402 may thus experience self-interference from UL transmission 420 to the reception by the UE of DL transmission 408. In other words, the UL transmission 420 may cause interference and prevent proper reception and decoding of the DL transmission 408. Further, as shown, UE 402 may experience interference from UE 406 and BS 414, while UE 406 is receiving DL transmissions from the BS 414.

FIG. 4C illustrates a deployment 400C including an FD UE with multi-transmission/reception point (TRP) communication. UE 402 may receive a DL transmission 430 from BS 414 and send an UL transmission 432 to BS 404. The DL transmission and the UL transmission 432 may overlap in the time-domain. Thus, the UE 402 may be operating in FD mode. The UE 402 may thus experience self-interference from the UL transmission 432 to the reception by the UE of DL transmission 430. In other words, the UL transmission 432 may cause interference and prevent proper reception and decoding of the DL transmission 408. Further, as shown, the UE 406 may receive DL transmissions from the BS 414.

Figure 5A:
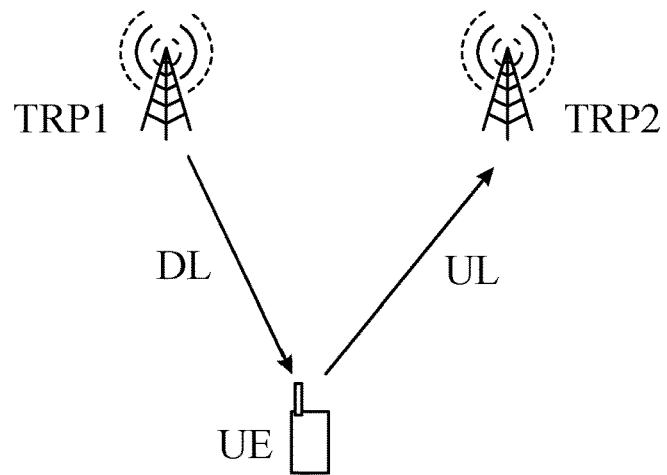
FIGS. 5A, 5B, and 5C illustrate example scenarios for communication between at least one user-equipment and at least one base station or transmission and reception point.
Figure 5B:
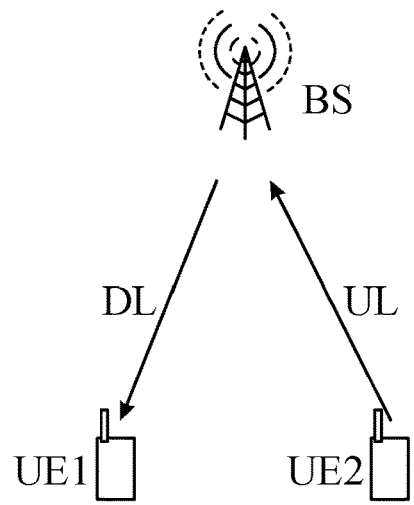
Figure 5C:
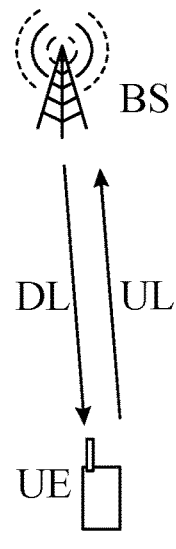

FIGS. 5A, 5B, and 5C illustrate example scenarios for communication between at least one UE and at least one base station (BS) or transmission and reception point (TRP). For example, as illustrated in FIG. 5A, a UE may be communicating using FD mode by simultaneously receiving signaling from TRP 1 on DL and transmitting signaling to TRP 2 on UL.

As illustrated in FIG. 5B, a BS may be communicating using FD. For instance, a BS may simultaneously transmit signaling to UE 1 on DL and receive signaling from UE 2 on UL.

As illustrated in FIG. 5C, both a UE and BS may be communicating using FD. For example, a BS may simultaneously transmit signaling to a UE and receive signaling from the same UE. Example use cases for each of the scenarios shown are provided herein.

FIG. 6 illustrates half-duplex (HD), as well as frequency division multiplexed (FDMed) FD, and spatial division multiplexed (SDMed) FD modes. As illustrated, when using HD mode, a RACH occasion (RO) cannot overlap in time with DL transmissions, such as synchronization signal block (SSB), physical downlink control channel (PDCCH), physical downlink shared channel (PDSCH), channel state information (CSI)-reference signal (RS). Transmission during RO using HD mode may also be referred to as time division multiplexed (TDMed) RO type. TDMed RO type may have a longer access delay as compared to using FD mode of communication. For FD mode, RO may overlap in time with DL transmissions, such as SSB, PDCCH, PDSCH, etc., to enable a more efficient system and lower latency. For an FDMed RO type, the RO and DL transmissions may share the same time resources but at different or partially different frequency resources with a guard band in between the frequency resources, as shown. For SDMed RO type, RO and DL transmissions may share the same time and frequency resources, as shown.

There are various use cases for FD RACH. For example, one use case may involve a UE in FD mode with two TRPs/cells that are well separated. That is, the UE may be connected with a primary cell (PCell) for DL transmissions such as SSB, PDCCH, or PDSCH, and the UE may simultaneously perform initial access RACH with a primary-secondary cell (PSCell). This use case could be a co-channel dual-connectivity (DC) case on serving cells. Beam measurements results may be reported from the PSCell to PCell in non-standalone (NSA) mode in order for the BS to select and use a selected DL beam for DL signals on PCell that overlaps with the signaling transmitted by the PSCell on the RO based on a corresponding UL RS.

For another use case, a UE may be connected with TRP1 for DL transmissions such as SSB, PDCCH, or PDSCH, and the UE may simultaneously need to do RACH with TRP2 (e.g., PDCCH order RACH for new timing advance (TA) on TRP2 on the serving cell). The BS may configure the DL/UL beam pair that can simultaneously transmit and receive for both TRPs for the RO and the DL signal based on the signal-to-interference-plus-noise ratio (SINR) via beam management (BM) measurements. In some implementations, the UE may choose the RO that doesn't interfere with the DL signal based on its BM measurements.

Some use cases may be applied when the UE is operating in FD mode. For example, the UE may be served by both serving and non-serving cells or the BS may select among both serving and non-serving cells to serve the UE, for a layer 1 (L1)/layer 2 (L2) based mobility scenario. For instance, the UE may be connected with serving cell 1 for DL transmissions, and the UE may simultaneously perform RACH with non-serving cell 2, such as PDCCH order RACH for configuring a new TA on cell 2. PDCCH order RACH generally refers to a RACH that is initiated by the BS (e.g., using a PDCCH). In some aspects, to support this use case, additional features may be specified. For example, UL RS may be transmitted on non-serving cells to be used as an interference measurement resource (IMR) quasi co-location (QCL) source. Meanwhile, a UE may measure beam sweeping DL RSs as channel measurement resources (CMRs) of the serving cell to select a paired DL beam based on SINRs. The UE may use the selected DL beam for DL signals overlapping with the RO during which a RACH preamble may be transmitted using a beam corresponding to the UL RS.

Another use case may include the UE being connected with a serving cell, and the serving cell performing PDCCH ordered RACH on a SSB for a new TA to be configured while the UE is simultaneously receiving DL signals such as SSBs/CSI-RSs from a non-serving cell. In some aspects of the present disclosure, to support this use case, the non-serving may transmit DL RSs to be measured as a CMR QCL source, meanwhile the UE may transmit UL RS as IMR of the serving cell to derive SINRs. The UE may use a selected DL beam for DL signals overlapping with the RO sending using a beam corresponding to the UL RS.

In some implementations, the BS may be in FD mode and inter-UE interference measurement may be coordinated. In one use case, the BS may send periodic (P)/aperiodic (AP) DL signals such as SSB/CSI-RS/PDSCH to a first UE and at the same time, a second UE may send initial access RACH MSG to the BS. To support this use case for periodic DL signals, a periodic DL/UL beam pair switching pattern may be configured on different DL/RACH occasions to enable simultaneous transmission (Tx) and reception (Rx). Per RO, the UE receiving DL signals may change with an associated DL beam change to pair with a changed UL beam per RO and per periodicity duration. To support this use case for aperiodic DL signals, a paired DL beam may be configured per RO beam to enable simultaneous Tx and Rx on the overlapped ROs (even if some ROs may not have preamble transmissions). In some cases, a DL UE may fail due to cross-link interference (CLI) from the UL RACH UE, so the use case may apply to only lower priority DL signals. A special case for dual-connectivity (DC) may be that a TRP may be managing the PCell for DL, and a TRP may manage a PSCell for UL. This use case may also be implemented for PDCCH TA RACH or beam failure recovery (BFR) RACH while in connected mode (e.g., instead of initial access RACH). For example, the BS may configure paired beams and resources. In connected mode, UEs may measure and report CLI (e.g., for the paired beams and resources), so that the BS may choose paired UEs for FD RACH which can increase DL quality.

In some cases, both the UE and BS may be in FD mode (e.g., two TRPs/cells may be close to each other). The use cases may be similar to other use cases described herein for the UE being in FD mode, but with TRP/BS self-interference (SI) being considered or may be similar to other use cases described herein for the BS being in FD mode, but with the UE SI being measured/considered.

Aspects Related to RACH Configuration

Certain aspects of the present disclosure are generally directed to techniques for providing information to a user-equipment (UE) indicating a configuration associated with random access channel occasions (ROs), allowing the UE to more efficiently select a RO to be used for RACH preamble transmission. For example, the BS may indicate that one RO is configured at the BS for half-duplex (HD) communication and a second RO is configured at the BS for full-duplex (FD) communication. If the UE measures a lower signal quality (e.g., lower reference signal receive power (RSRP) due to the UE being farther from the BS), the UE may decide to use the first RO configured at the BS for HD communication to increase the likelihood of UL reception of the RACH preamble. Other example implementations are described in more detail herein.

Figure 7:
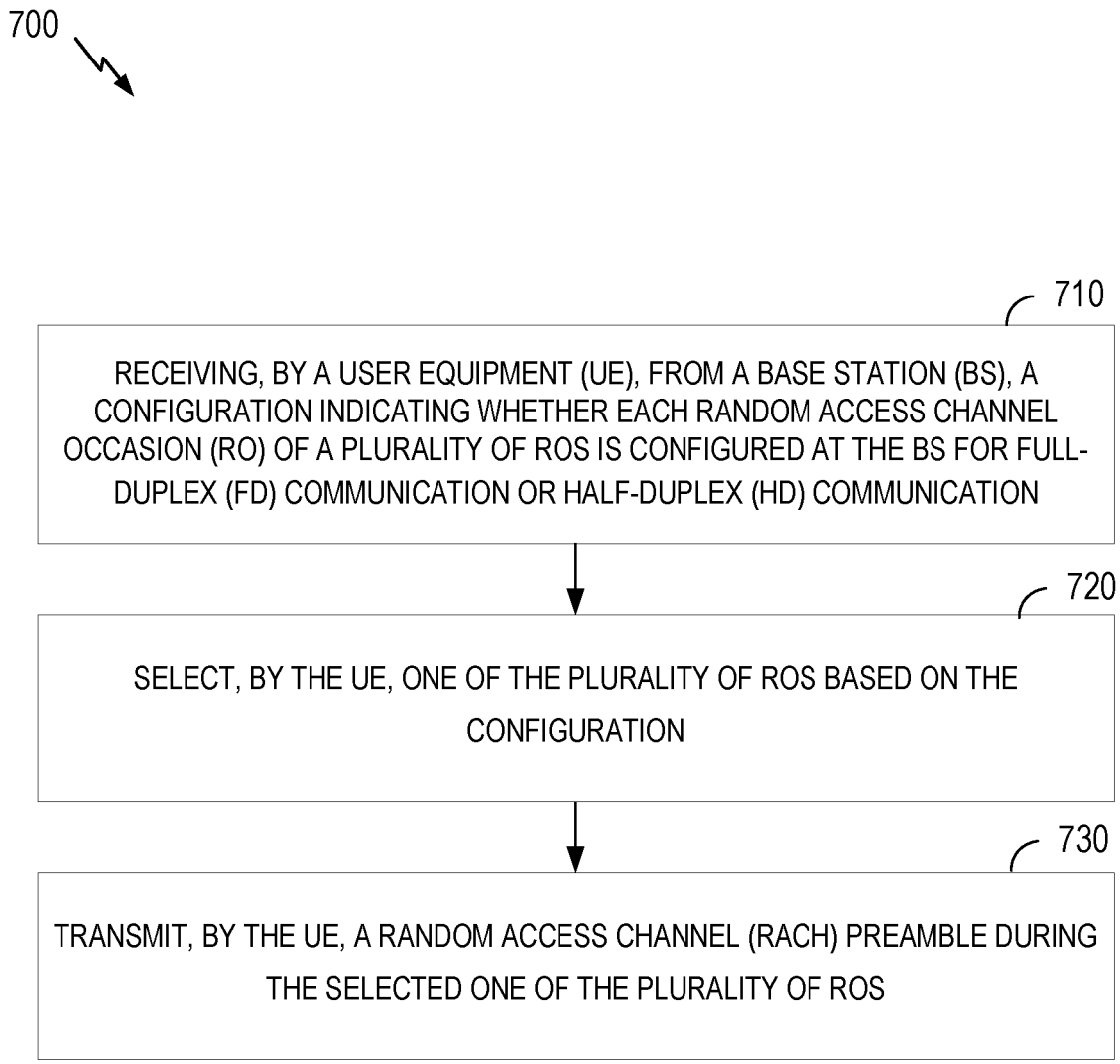
FIG. 7 is a flow diagram illustrating example operations for wireless communication by a UE.

FIG. 7 is a flow diagram illustrating example operations 700 for wireless communication. The operations 700 may be performed, for example, by a UE (e.g., the UE 104 in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 begin, at block 710, with the UE receiving, from a BS, a configuration indicating whether each RO of a plurality of ROs is configured at the BS for FD communication or HD communication. In other words, if a RO is configured at the BS for FD communication (also referred to as an FD RO), the BS may receive UL signaling (e.g., RACH preamble) and transmit DL signaling simultaneously during the RO. If a RO is configured at the BS for HD communication (also referred to as an HD RO), the BS may not receive UL signaling (e.g., RACH preamble) and transmit DL signaling simultaneously during the RO (e.g., the UL signaling and DL signaling may be time-division multiplexed (TDMed). As used herein, UL and DL signaling are considered to be simultaneous if the DL and UL signaling at least partially overlap in the time domain.

In some aspects, the configuration may further indicate a signal quality threshold (e.g., RSRP or SINR threshold) for beam selection associated with the RO. The UE may select a beam (or beam pair) for transmitting the RACH preamble (or both transmitting the RACH preamble on the UL and receiving DL signaling using the beam pair) based on the signal quality threshold.

At block 720, the UE selects one of the plurality of ROs based on the configuration. As an example, a UE that has measured lower average DL synchronization signal block (SSB) reference signal receive power (RSRP) (e.g., indicating that the UE is farther from the BS) may determine to use HD RO to increase the likelihood that UL reception is successful due to BS self-interference that would otherwise be present in an FD RO. On the other hand, a UE with a measured higher average DL RSRP (e.g., indicating that the UE is closer to the BS) may use an FD RO (e.g., to increase resource utilization). At block 730, the UE transmits a RACH preamble during the selected one of the plurality of ROs.

FIG. 8 is a flow diagram illustrating example operations 800 for wireless communication. The operations 800 may be performed, for example, by a network entity and/or a BS (e.g., the BS 102 in the wireless communication network 100). The operations 800 may be complementary to the operations 700 performed by the UE. The operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 begin, at block 810, by transmitting, to a UE, a configuration indicating whether each RO of a plurality of ROs is configured at the BS for FD communication or HD communication. At block 820, the BS receives a RACH preamble during one of the plurality of ROs using the FD or the HD communication in accordance with the configuration. The operations 700 and 800 may be understood in more detail with respect to FIGS. 9-11.

Figure 9:
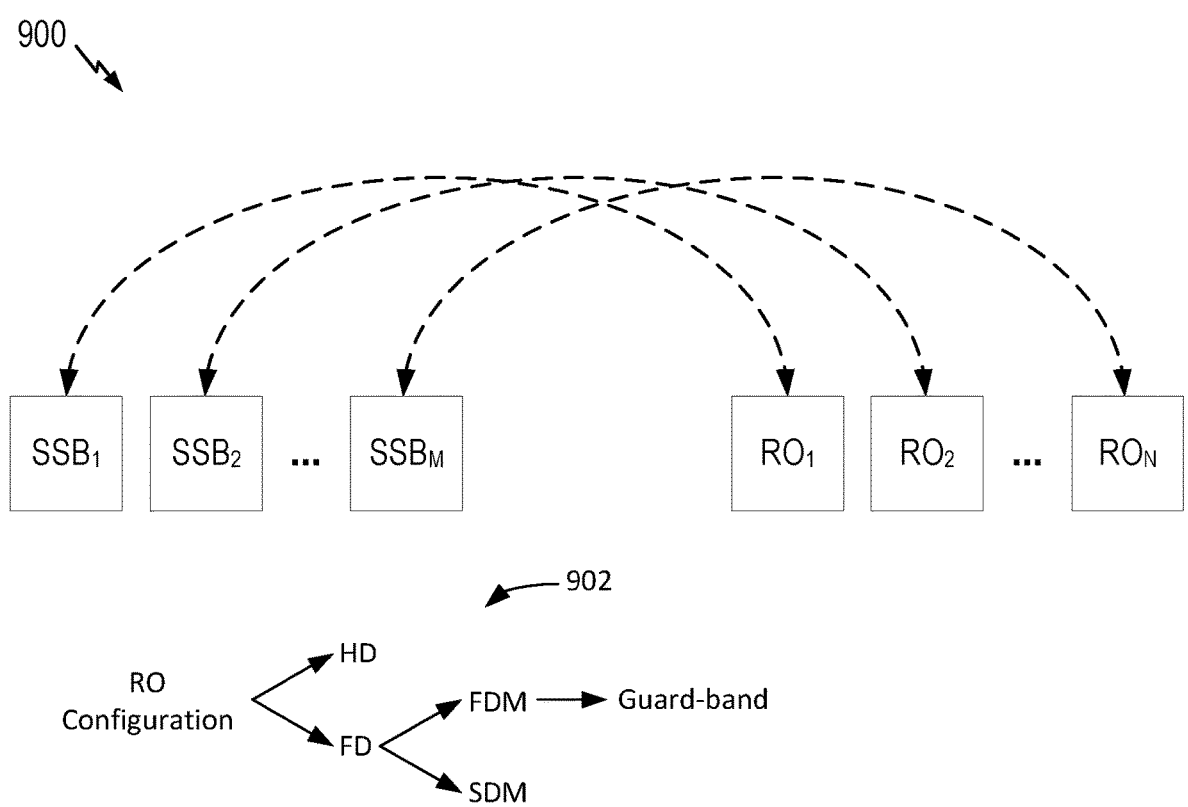
FIG. 9 shows example random access channel occasions and associated synchronization signal blocks.

FIG. 9 shows an example configuration 900 of ROs (e.g., $RO_1$ to $RO_N$, N being an integer greater than 1), each of the ROs being associated with a SSB (e.g., $SSB_1$ to $SSB_M$, M being an integer greater than 1). While FIG. 9 shows each RO associated with an SSB, multiple ROs may be associated with the same SSB (e.g., associated with a beam corresponding to the SSB). For example, $RO_2$ and $RO_{67}$ may be both associated with $SSB_2$.

As described, a BS may transmit, to a UE, a configuration indicating whether each of the ROs is configured at the BS for FD communication or HD communication. As illustrated by diagram 902, if the RO is configured for FD communication, the BS may indicate whether the RO is configured as FDM or SDM (e.g., as described with respect to FIG. 6). If the RO is configured as FDM, the BS may indicate the size of the guard band associated with the RO. The UE may take this information into account when deciding which of the ROs to use for RACH preamble transmission. In other words, the UE may know that an HD RO may be more reliable than an FD RO. Moreover, the UE may know that an FDM RO with a larger guard band may be more reliable than an FDM RO with a smaller guard band. This information allows the UE to make a tradeoff between increasing reliability, reducing latency, and increasing resource utilization.

Figure 10:
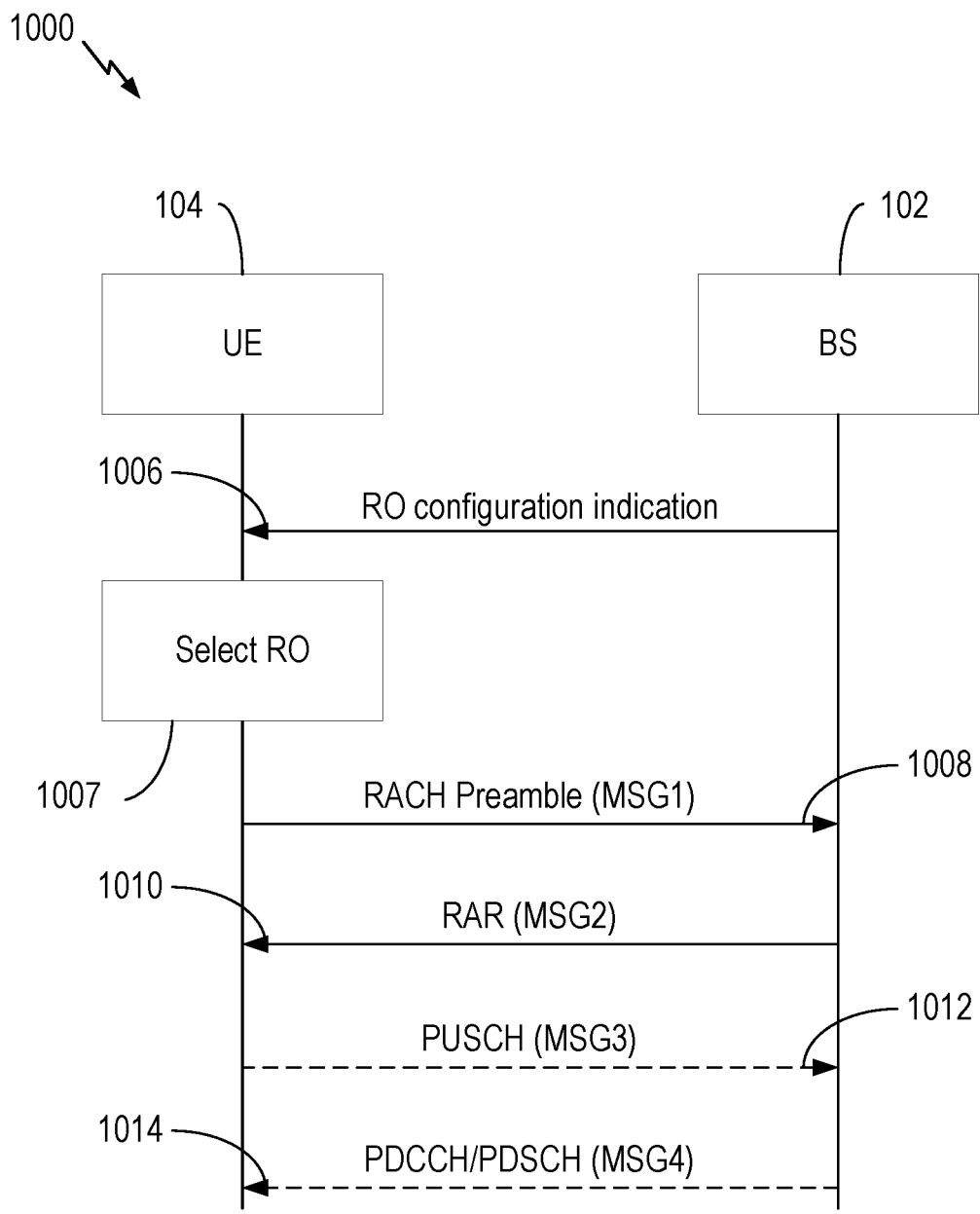
FIG. 10 is a call flow diagram illustrating example operations for configuring a random access channel procedure.

FIG. 10 is a call flow diagram illustrating example operations 1000 for configuring a RACH procedure. As illustrated, the BS 102 may indicate the RO configuration indication 1006 to the UE 104. At block 1007, the UE may select the RO based on the configuration indication 1006. For instance, as described herein, if the UE measures a lower RSRP of an SSB associated with two ROs, indicating that the UE is far from the BS, the UE may use the RO that is configured for HD communication at the BS to increase reliability. In some cases, if the UE has latency specifications, the UE may select the earliest RO regardless of the RO configuration to reduce latency associated with communication with the BS.

In some aspects, the RO configuration indication 1006 may indicate a corresponding RSRP or SINR threshold for beam or beam pair selection for each RO. ROs of different types may have different RSRP or SINR thresholds. As described with respect to FIG. 9, each RO may be associated with an SSB. The UE may make RSRP measurements of an SSB, and if the RSRP measurement meets the RSRP threshold indicated by the RO configuration indication 1006 for a corresponding RO, the UE may use the RO for RACH preamble transmission. Similarly, if the UE is in FD mode of operation, the UE may make SINR measurements using the SSB as well as an UL RS transmission, as described in more detail herein with respect to FIG. 11. If the measured SINR parameter meets the indicated SINR threshold, the UE may use the corresponding RO for the RACH preamble transmission while operating in FD mode.

As shown, during the selected RO, the UE may transmit a first message (MSG1) to the BS 102 on a physical random access channel (PRACH). In this case, MSG1 may include a RACH preamble 1008. BS 102 may respond with a random access response (RAR) message 1010 (MSG2) which may include the identifier (ID) of the RACH preamble, a timing advance (TA), an uplink grant, cell radio network temporary identifier (C-RNTI), and a back off indicator (BI). MSG2 may include a PDCCH communication including control information for (e.g., scheduling a reception of) a following communication on the PDSCH, as illustrated. In response to MSG2, MSG3 is transmitted from the UE 104 to BS 102 on the PUSCH 1012. MSG3 may include one or more of a RRC connection request, a tracking area update request, a system information request, a positioning fix or positioning signal request, or a scheduling request. The BS 102 then responds with MSG4, which may include a contention resolution message 1014. The RACH procedure described with respect to FIG. 10 is only one example provided to facilitate understanding, and other RACH procedures may be possible.

In some aspects, for initial access RO, the RO configuration indication 1006 may be via a broadcasting signal (e.g., remaining minimum system information (RMSI) broadcast signal). For a connected mode UE, the RO configuration indication 1006 may be via a radio resource control (RRC) signaling. One example use case may be indicating the RO configuration for periodic DL signals that are overlapped with ROs (periodic) using RRC signaling. For a connected mode UE, the RO configuration indication 1006 may be via downlink control information (DCI) or medium access control (MAC)-control element (CE) that schedules dynamic DL transmissions which are overlapped with some particular RO(s).

Figure 11:
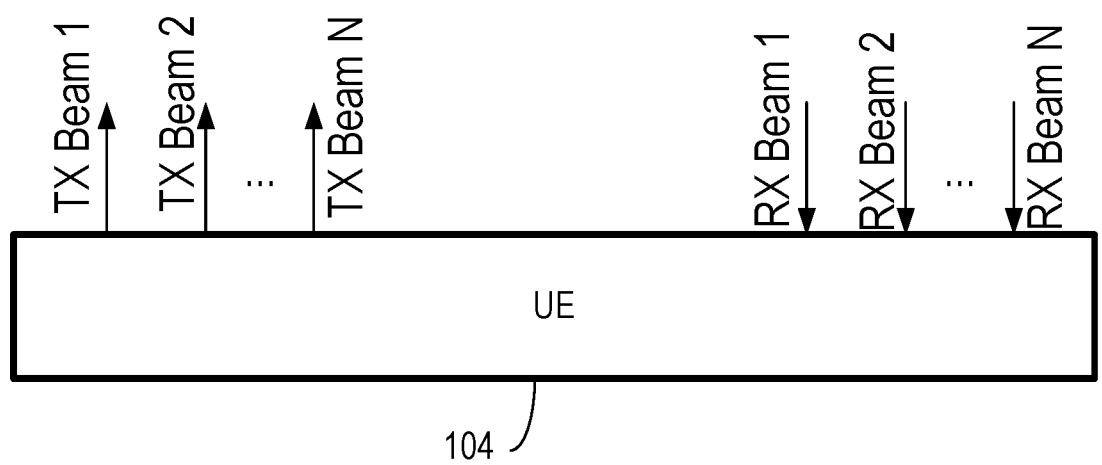
FIG. 11 illustrates a user equipment in a full duplex mode of operation.

FIG. 11 illustrates a UE in an FD mode of operation. As illustrated, the UE 104 may transmit (e.g., sweep) at least one UL RS on each of the UL beams (e.g., TX beam 1 to TX beam N, N being an integer greater than 1) on a first cell (e.g., a serving cell or a non-serving cell of the UE). The UE may also receive, from a BS, at least one DL RS on a second cell (e.g., a non-serving cell or a serving cell of the UE) on each of the DL beams (e.g., RX beam 1 to RX beam N, N being an integer greater than 1). For instance, the UE may transmit on TX beam 1, while receiving on each of Rx beams 1-N, then transmit on Tx beam 2, while receiving on each of Rx beams 1-N, and so on. The UE may calculate a signal-to-interference-plus-noise ratio (SINR) parameter for each DL and UL beam pair based on the at least one UL RS (e.g., facilitating a measure of self-interference at the UE) and the at least one DL RS.

The UE may then select one DL and UL beam pair based on the SINR parameters. For example, the UE may select the DL and UL beam pair that meets a specific SINR threshold for communicating during a specific RO. The UE may then receive, during the selected one of the plurality of ROs, a DL signal using the selected DL beam. Moreover, a beam used to transmit the RACH preamble during the RO may correspond to an UL beam used to transmit the at least one UL RS. In some aspects, the UE may report the SINR parameter to the BS, allowing the BS to make the selection of the DL and UL beam pair to be used, and report the selection to the UE.

Certain aspects of the present disclosure provide priority-based RO selection. For example, for a connected mode UE, a BS may indicate a priority associated with the UE (e.g., via a priority field of a message such as a MAC-CE or DCI). The priority associated with the UE may be based on a traffic type associated with the UE. The priority field may be used for beam failure recovery (BFR) and/or timing advance (TA) RACH. Higher priority UEs may use HD RO to increase the likelihood of successful UL reception at the BS, while lower priority UEs may select FD ROs. For initial access, the priority may be based on the UE's subscribed service class/priority (e.g., in UE profile, such as in UE SIM card) to determine RO selection priority. In some aspects, a higher priority UE may select an RO with a relatively larger guard band as compared to other ROs since a larger guard band reduces the interference between DL and UL signaling. If no HD RO is available for a higher priority UE to use (e.g., none of the HD ROs meet the associated signal quality threshold), the UE may use an FD RO.

In some cases, a UE may receive an SSB simultaneously while transmitting a RACH message. In such a case, the UE may skip the reception of the SSB. In some aspects, the SSB beam index and RACH beam index may be offset so that the DL beam used to receive the SSB and the UL beam used for RACH transmission are not the same, allowing the UE to receive both the SSB and transmit the RACH message.

The RO configuration described herein facilitates efficient communication when BS is in FD mode of operation. When the UE is in FD mode, the UE is likely in connected mode since there is already DL signaling to the UE. In this case, whether the UL signaling should be configured in an FD or HD RO may be implicitly indicated to the UE by scheduling information (e.g., using DL and UL scheduling or only single DL or single UL scheduling). Moreover, with the UE being in connected mode, beams/beam pairs can be measured periodically or aperiodically. RO to be used may be configured by the BS (e.g., for PDCCH ordered RACH for new TA) if the UE is in connected mode, in some cases. In other words, the BS may determine whether the UE is to use the RO with the best beam/beam pair quality, or rather, select the soonest RO to meet latency specifications or requirements.

Example Wireless Communication Devices

Figure 12:
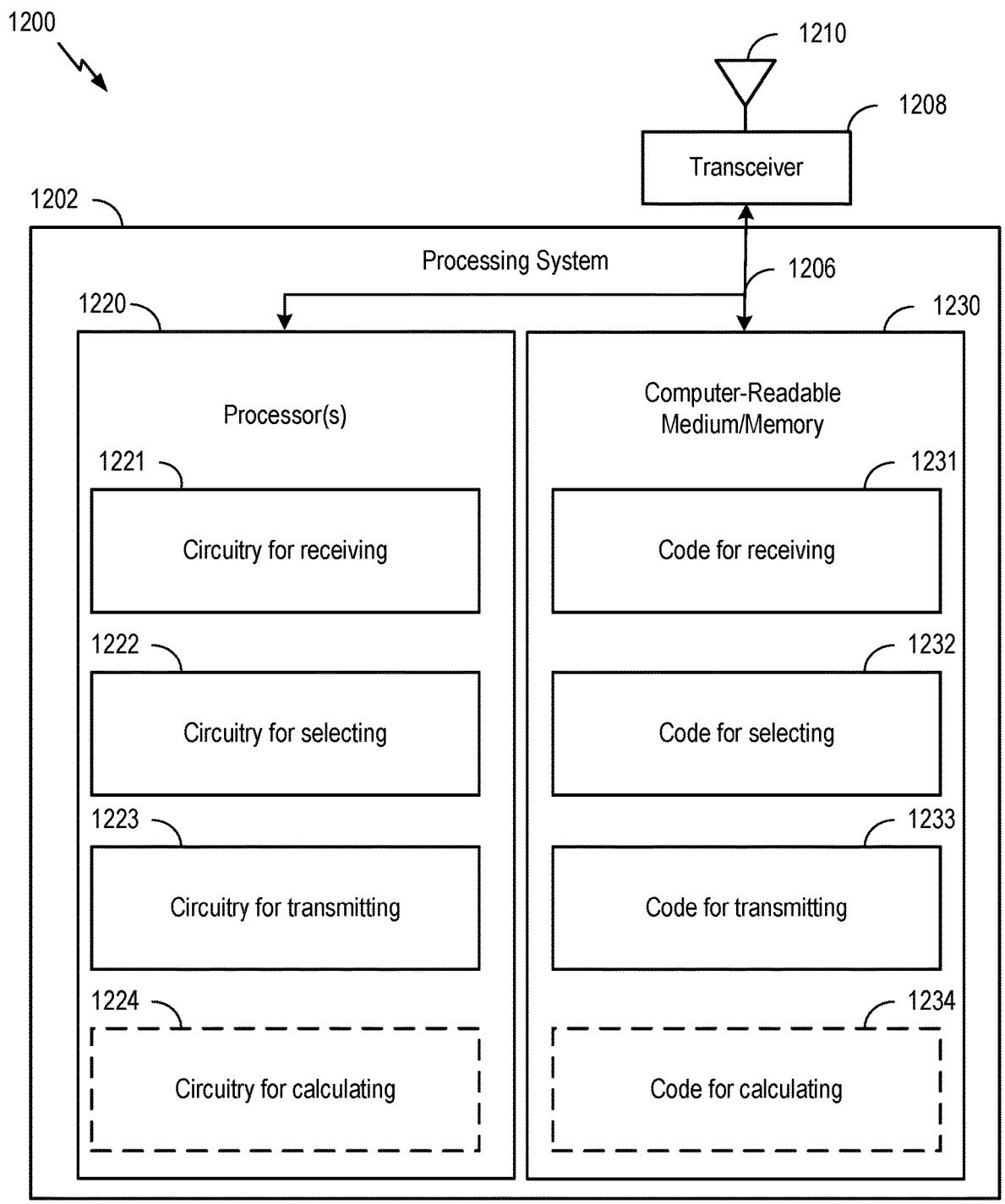
FIGS. 12 and 13 depict example communications devices that include various components operable, configured, or adapted to perform operations for the techniques disclosed herein.

FIG. 12 depicts an example communications device 1200 that includes various components operable, configured, or adapted to perform operations for the techniques disclosed herein, such as the operations depicted and described with respect to FIGS. 7-11. In some examples, communication device 1200 may be a user equipment 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 7 and 10, or other operations for performing the various techniques discussed herein for random access channel (RACH) procedure configuration.

In the depicted example, computer-readable medium/memory 1230 stores code 1231 for receiving (e.g., receiving a configuration indicating whether each random access channel occasion (RO) of a plurality of ROs is configured at the BS for full-duplex (FD) communication or half-duplex (HD) communication); code 1232 for selecting (e.g., selecting one of the plurality of ROs based on the configuration); and code 1233 for transmitting (e.g., transmitting a RACH preamble during the selected one of the plurality of ROs). The computer-readable medium/memory 1230 may optionally also include code 1234 for calculating.

In the depicted example, the one or more processors 1220 include circuitry configured to implement the code stored in the computer-readable medium/memory 1230, including circuitry 1221 for receiving (e.g., receiving a configuration indicating whether each RO of a plurality of ROs is configured at the BS for FD communication or HD communication); circuitry 1222 for selecting (e.g., selecting one of the plurality of ROs based on the configuration); and circuitry 1223 for transmitting (e.g., transmitting a RACH preamble during the selected one of the plurality of ROs). The one or more processors 1220 may optionally also include circuitry 1224 for calculating.

Various components of communications device 1200 may provide means for performing the methods described herein, including with respect to FIGS. 7 and 10.

In some examples, means for transmitting or sending (or means for outputting for transmission) may include the transceivers 254 and/or antenna(s) 252 of the user equipment 104 illustrated in FIG. 2 and/or transceiver 1208 and antenna 1210 of the communication device 1200 in FIG. 12.

In some examples, means for receiving (or means for obtaining) may include the transceivers 254 and/or antenna(s) 252 of the user equipment 104 illustrated in FIG. 2 and/or transceiver 1208 and antenna 1210 of the communication device 1200 in FIG. 12.

In some examples, means for selecting and/or means for calculating may include various processing system components, such as: the one or more processors 1220 in FIG. 12, or aspects of the user equipment 104 depicted in FIG. 2, including receive processor 258, transmit processor 264, TX MIMO processor 266, and/or controller/processor 280 (including RACH component 281).

Notably, FIG. 12 is just use example, and many other examples and configurations of communication device 1200 are possible.

Figure 13:
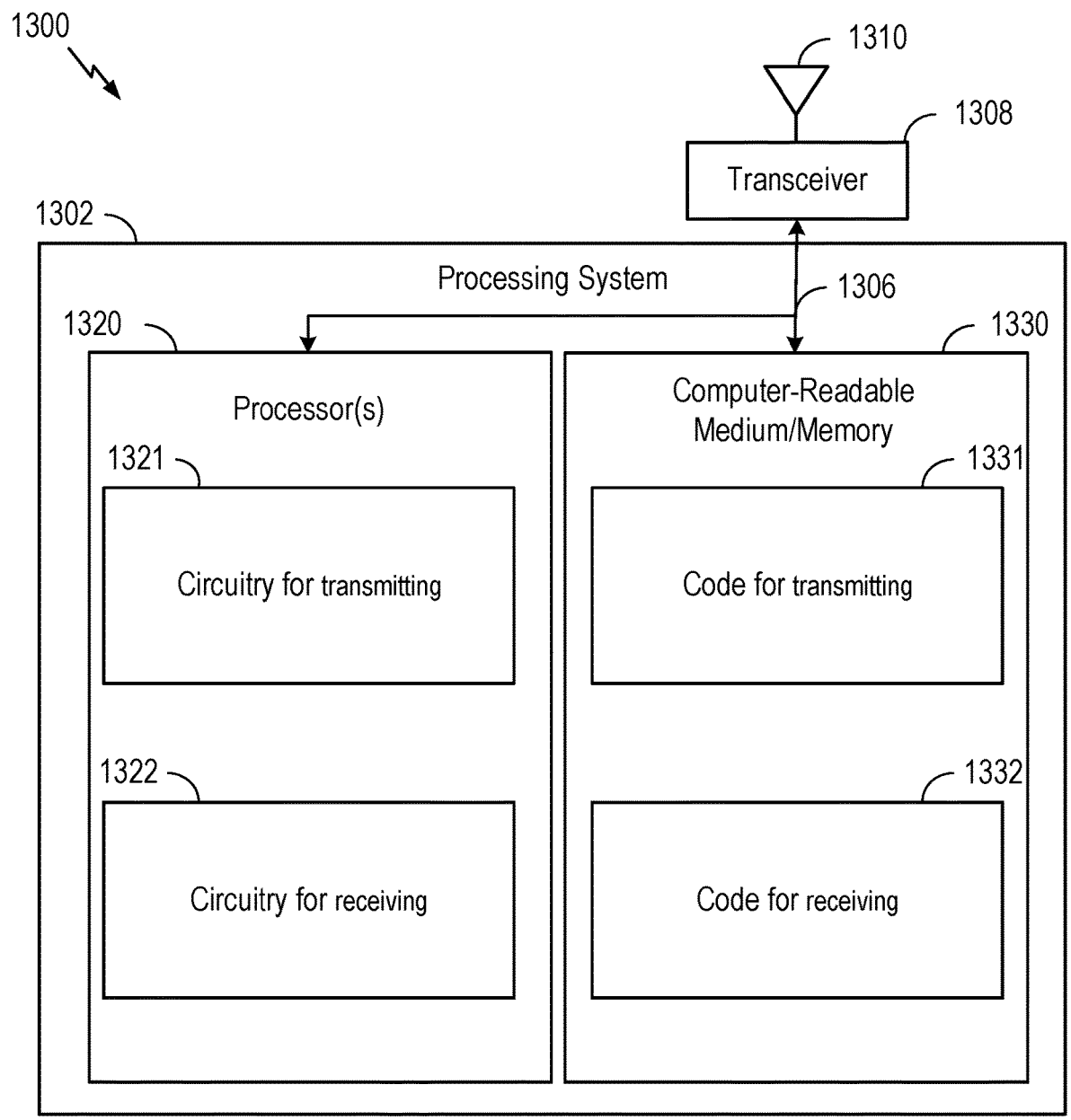

FIG. 13 depicts an example communications device 1300 that includes various components operable, configured, or adapted to perform operations for the techniques disclosed herein, such as the operations depicted and described with respect to FIGS. 8 and 10. In some examples, communication device 1300 may be a base station 102 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 8 and 10, or other operations for performing the various techniques discussed herein for configuring a RACH procedure.

In the depicted example, computer-readable medium/memory 1330 stores code 1331 for transmitting (e.g., transmitting a configuration indicating whether each RO of a plurality of ROs is configured at the BS for FD communication or HD communication); and code 1332 for receiving (e.g., receiving a RACH preamble during one of the plurality of ROs using the FD or the HD communication in accordance with the configuration).

In the depicted example, the one or more processors 1320 include circuitry configured to implement the code stored in the computer-readable medium/memory 1330, including circuitry 1321 for transmitting (e.g., transmitting a configuration indicating whether each RO of a plurality of ROs is configured at the BS for FD communication or HD communication); and circuitry 1322 for receiving (e.g., receiving a RACH preamble during one of the plurality of ROs using the FD or the HD communication in accordance with the configuration).

Various components of communications device 1300 may provide means for performing the methods described herein, including with respect to FIGS. 8 and 10.

In some examples, means for transmitting or sending (or means for outputting for transmission) may include the transceivers 232 and/or antenna(s) 234 of the base station 102 illustrated in FIG. 2 and/or transceiver 1308 and antenna 1310 of the communication device 1300 in FIG. 13.

In some examples, means for receiving (or means for obtaining) may include the transceivers 232 and/or antenna(s) 234 of the base station illustrated in FIG. 2 and/or transceiver 1308 and antenna 1310 of the communication device 1300 in FIG. 13.

In some examples, means for determining may include various processing system components, such as: the one or more processors 1320 in FIG. 13, or aspects of the base station 102 depicted in FIG. 2, including receive processor 238, transmit processor 220, TX MIMO processor 230, and/or controller/processor 240 (including RACH component 241).

Notably, FIG. 13 is just use example, and many other examples and configurations of communication device 1300 are possible.

EXAMPLE CLAUSES

Implementation examples are described in the following numbered clauses:

Clause 1. A method for wireless communication by a user-equipment (UE), comprising: receiving, from a base station (BS), a configuration indicating whether each random access channel occasion (RO) of a plurality of ROs is configured at the BS for full-duplex (FD) communication or half-duplex (HD) communication; selecting one of the plurality of ROs based on the configuration; and transmitting a random access channel (RACH) preamble during the selected one of the plurality of ROs.

Clause 2. The method of claim 1, wherein the configuration indicates that the RO uses FD, and wherein the configuration further indicates whether the RO uses frequency division multiplexing (FDM) or spatial division multiplexing (SDM).

Clause 3. The method of claim 2, wherein the configuration indicates that the RO uses the FDM, and wherein the configuration further indicates a bandwidth associated with a guard band between DL and UL for the FDM.

Clause 4. The method of claim 1, wherein the receiving the configuration comprises receiving a bitmap indicating a synchronization signal block (SSB) transmission pattern, and wherein the bitmap further indicates the configuration.

Clause 5. The method of claim 1, wherein: the configuration further indicates a signal quality threshold for beam selection associated with the RO, and the method further comprising selecting a beam for transmitting the RACH preamble based on the signal quality threshold.

Clause 6. The method of claim 5, further comprising selecting another beam for receiving downlink (DL) signaling during the RO.

Clause 7. The method of claim 5, wherein the signal quality threshold includes at least one of a reference signal receive power (RSRP) or a signal-to-interference-plus-noise ratio (SINR) threshold.

Clause 8. The method of claim 1, wherein the configuration further indicates a transmit power to be used for transmission during the RO.

Clause 9. The method of claim 1, wherein at least two of the plurality of ROs have different types, and wherein the configuration indicates a different transmit power to be used for transmission during each of the at least two of the plurality of ROs.

Clause 10. The method of claim 1, wherein receiving the configuration comprises receiving a broadcast signal indicating the configuration.

Clause 11. The method of claim 10, wherein broadcast signal comprises remaining minimum system information (RMSI).

Clause 12. The method of claim 1, wherein receiving the configuration comprises receiving a radio resource control (RRC) message, downlink control information (DCI), or a medium access control (MAC) control element (CE) indicating the configuration.

Clause 13. The method of claim 12, wherein the RRC message, DCI or the MAC-CE schedules a downlink transmission that overlaps with one or more of the plurality of ROs.

Clause 14. The method of claim 1, further comprising: transmitting at least one uplink (UL) reference signal (RS) on each of a plurality of UL beams on a first cell; receiving at least one downlink (DL) RS on a second cell on each of a plurality of DL beams; calculating a signal-to-interference-plus-noise ratio (SINR) parameter for each DL and UL beam pair of the plurality of DL and UL beams based on the at least one UL RS and the at least one DL RS; selecting one DL and UL beam pair of the plurality of DL and UL beams based on the SINR parameters; and receiving, during the selected one of the plurality of ROs, a DL signal using the selected DL beam of the plurality of DL beams.

Clause 15. The method of claim 14, wherein a beam used to transmit the RACH preamble during the selected one of the plurality of ROs corresponds to the selected UL beam of the plurality of UL beams.

Clause 16. The method of claim 14, wherein: the first cell is a non-serving cell, and the second cell is a serving cell.

Clause 17. The method of claim 14, wherein: the first cell is a serving cell, and the second cell is a non-serving cell.

Clause 18. A method for wireless communication by a base station (BS), comprising: transmitting, to a user-equipment (UE), a configuration indicating whether each random access channel occasion (RO) of a plurality of ROs is configured at the BS for full-duplex (FD) communication or half-duplex (HD) communication; and receiving a random access channel (RACH) preamble during one of the plurality of ROs using the FD or the HD communication in accordance with the configuration.

Clause 19. The method of claim 18, wherein the configuration indicates that the RO uses FD, and wherein the configuration further indicates whether the RO uses frequency division multiplexing (FDM) or spatial division multiplexing (SDM).

Clause 20. The method of claim 19, wherein the configuration indicates that the RO uses the FDM, and wherein the configuration further indicates a bandwidth associated with a guard band between DL and UL for the FDM.

Clause 21. The method of claim 18, wherein transmitting the configuration comprises transmitting a bitmap indicating a synchronization signal block (SSB) transmission pattern, and wherein the bitmap further indicates the configuration.

Clause 22. The method of claim 18, wherein the configuration further indicates a signal quality threshold for beam selection associated with the RO.

Clause 23. The method of claim 22, wherein the signal quality threshold includes at least one of a reference signal receive power (RSRP) or a signal-to-interference-plus-noise ratio (SINR) threshold.

Clause 24. The method of claim 18, wherein the configuration further indicates a transmit power to be used for transmission during the RO.

Clause 25. The method of claim 18, wherein at least two of the plurality of ROs have different types, and wherein the configuration indicates a different transmit power to be used for transmission during each of the at least two of the plurality of ROs.

Clause 26. The method of claim 18, wherein transmitting the configuration comprises transmitting a broadcast signal indicating the configuration.

Clause 27. The method of claim 26, wherein broadcast signal comprises remaining minimum system information (RMSI).

Clause 28. The method of claim 18, wherein transmitting the configuration comprises transmitting a radio resource control (RRC) message, downlink control information (DCI), or a medium access control (MAC) control element (CE) indicating the configuration.

Clause 29. The method of claim 18, wherein the RRC or DCI or the MAC-CE schedules a downlink transmission that overlaps with one or more of the plurality of ROs.

Clause 30. The method of claim 18, further comprising transmitting at least one downlink (DL) RS on a first cell on each of a plurality of DL beams, the at least one DL RS to be used for calculating a signal-to-interference-plus-noise ratio (SINR) parameter for DL and UL beam pair selection.

Clause 31: An apparatus, comprising: a memory comprising executable instructions; one or more processors configured to execute the executable instructions and cause the apparatus to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by one or more processors of an apparatus, cause the apparatus to perform a method in accordance with any one of Clauses 1-30.

Clause 34: A computer program product embodied on a computer-readable storage medium comprising code for performing a method in accordance with any one of Clauses 1-30.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of RACH configuration in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user-equipment (UE), comprising:
    receiving, from a base station (BS), a configuration indicating whether each random access channel occasion (RO) of a plurality of ROs is configured at the BS for full-duplex (FD) communication or half-duplex (HD) communication;
    selecting one of the plurality of ROs based on the configuration; and
    transmitting a random access channel (RACH) preamble during the selected one of the plurality of ROs.

2. The method of claim 1, wherein the configuration indicates that the selected one of the plurality of ROs uses FD, and wherein the configuration further indicates whether the selected one of the plurality of ROs uses frequency division multiplexing (FDM) or spatial division multiplexing (SDM).

3. The method of claim 2, wherein the configuration indicates that the selected one of the plurality of ROs uses the FDM, and wherein the configuration further indicates a bandwidth associated with a guard band between DL and UL for the FDM.

4. The method of claim 1, wherein the receiving the configuration comprises receiving a bitmap indicating a synchronization signal block (SSB) transmission pattern, and wherein the bitmap further indicates the configuration.

5. The method of claim 1, wherein:
    the configuration further indicates a signal quality threshold for beam selection associated with the selected one of the plurality of ROs, and the method further comprising selecting a beam for transmitting the RACH preamble based on the signal quality threshold.

6. The method of claim 5, further comprising selecting another beam for receiving downlink (DL) signaling during the selected one of the plurality of ROs.

7. The method of claim 5, wherein the signal quality threshold includes at least one of a reference signal receive power (RSRP) or a signal-to-interference-plus-noise ratio (SINR) threshold.

8. The method of claim 1, wherein the configuration further indicates a transmit power to be used for transmission during the selected one of the plurality of ROs.

9. The method of claim 1, wherein at least two of the plurality of ROs have different types, and wherein the configuration indicates a different transmit power to be used for transmission during each of the at least two of the plurality of ROs.

10. The method of claim 1, wherein receiving the configuration comprises receiving a broadcast signal indicating the configuration.

11. The method of claim 10, wherein broadcast signal comprises remaining minimum system information (RMSI).

12. The method of claim 1, wherein receiving the configuration comprises receiving a radio resource control (RRC) message, downlink control information (DCI), or a medium access control (MAC) control element (CE) indicating the configuration.

13. The method of claim 12, wherein the RRC message, the DCI, or the MAC CE schedules a downlink transmission that overlaps with one or more of the plurality of ROs.

14. The method of claim 1, further comprising:
transmitting at least one uplink (UL) reference signal (RS) on each of a plurality of UL beams on a first cell;
receiving at least one downlink (DL) RS on a second cell on each of a plurality of DL beams;
calculating a signal-to-interference-plus-noise ratio (SINR) parameter for each DL and UL beam pair of the plurality of DL and UL beams based on the at least one UL RS and the at least one DL RS;
selecting one DL and UL beam pair of the plurality of DL and UL beams based on the SINR parameters; and
receiving, during the selected one of the plurality of ROs, a DL signal using the selected DL beam of the plurality of DL beams.

15. The method of claim 14, wherein a beam used to transmit the RACH preamble during the selected one of the plurality of ROs corresponds to the selected UL beam of the plurality of UL beams.

16. The method of claim 14, wherein:
the first cell is a non-serving cell, and
the second cell is a serving cell.

17. The method of claim 14, wherein:
the first cell is a serving cell, and
the second cell is a non-serving cell.

18. A method for wireless communication by a base station (BS), comprising:
transmitting, to a user-equipment (UE), a configuration indicating whether each random access channel occasion (RO) of a plurality of ROs is configured at the BS for full-duplex (FD) communication or half-duplex (HD) communication; and
receiving a random access channel (RACH) preamble during one RO of the plurality of ROs using FD or HD communication in accordance with the configuration.

19. The method of claim 18, wherein the configuration indicates that the one RO of the plurality of ROs uses FD, and wherein the configuration further indicates whether the one RO of the plurality of ROs uses frequency division multiplexing (FDM) or spatial division multiplexing (SDM).

20. The method of claim 19, wherein the configuration indicates that the one RO of the plurality of ROs uses the FDM, and wherein the configuration further indicates a bandwidth associated with a guard band between DL and UL for the FDM.

21. The method of claim 18, wherein transmitting the configuration comprises transmitting a bitmap indicating a synchronization signal block (SSB) transmission pattern, and wherein the bitmap further indicates the configuration.

22. The method of claim 18, wherein the configuration further indicates a signal quality threshold for beam selection associated with the one RO of the plurality of ROs.

23. The method of claim 18, wherein the configuration further indicates a transmit power to be used for transmission during the one RO of the plurality of ROs.

24. The method of claim 18, wherein at least two of the plurality of ROs have different types, and wherein the configuration indicates a different transmit power to be used for transmission during each of the at least two of the plurality of ROs.

25. The method of claim 18, wherein transmitting the configuration comprises transmitting a broadcast signal indicating the configuration.

26. The method of claim 18, wherein transmitting the configuration comprises transmitting a radio resource control (RRC) message, downlink control information (DCI), or a medium access control (MAC) control element (CE) indicating the configuration.

27. The method of claim 26, wherein the RRC, the DCI, or the MAC CE schedules a downlink transmission that overlaps with one or more of the plurality of ROs.

28. The method of claim 18, further comprising transmitting at least one downlink (DL) RS on a first cell on each of a plurality of DL beams, the at least one DL RS to be used for calculating a signal-to-interference-plus-noise ratio (SINR) parameter for DL and UL beam pair selection.

29. An apparatus for wireless communication by a user-equipment (UE), comprising
a memory comprising executable instructions; and
one or more processors configured to execute the executable instructions and cause the apparatus to:
receive, from a base station (BS), a configuration indicating whether each random access channel occasion (RO) of a plurality of ROs is configured at the BS for full-duplex (FD) communication or half-duplex (HD) communication;
select one of the plurality of ROs based on the configuration; and
transmit a random access channel (RACH) preamble during the selected one of the plurality of ROs.

30. An apparatus for wireless communication by a base station (BS), comprising
a memory comprising executable instructions; and
one or more processors configured to execute the executable instructions and cause the apparatus to:
transmit, to a user-equipment (UE), a configuration indicating whether each random access channel occasion (RO) of a plurality of ROs is configured at the BS for full-duplex (FD) communication or half-duplex (HD) communication; and
receive a random access channel (RACH) preamble during one RO of the plurality of ROs using FD or HD communication in accordance with the configuration.

* * * * *